United States Patent [19]

Berney

[11] 3,979,878
[45] Sept. 14, 1976

[54] CONTAINER ACCUMULATING APPARATUS

[76] Inventor: Joseph C. Berney, 15164 Golden West Circle, Westminster, Calif. 92683

[22] Filed: Oct. 16, 1974

[21] Appl. No.: 515,297

[52] U.S. Cl. .................................... 53/61; 53/159
[51] Int. Cl.² .................. B65B 57/14; B65B 35/40
[58] Field of Search ............... 53/61, 62, 159, 164, 53/166

[56] References Cited
UNITED STATES PATENTS

| | | | |
|---|---|---|---|
| 2,684,799 | 7/1954 | Holstein | 53/62 |
| 2,869,297 | 1/1959 | Neer | 53/164 X |
| 2,993,316 | 7/1961 | Kerr | 53/62 |
| 3,060,659 | 10/1962 | Blais et al. | 53/61 X |
| 3,353,331 | 11/1967 | Rowekamp | 53/166 |
| 3,570,216 | 3/1971 | Frentzel | 53/61 X |
| 3,694,993 | 10/1972 | East | 53/159 X |
| 3,727,366 | 4/1973 | Schlueter et al. | 53/61 |

Primary Examiner—Robert L. Spruill

[57] ABSTRACT

An apparatus and method to accumulate a desired array for packaging and to transfer them as a unit to a casing machine. One or more rows of the containers are accumulated, each in the desired number, between side guides. The guides are then removed and the accumulated array is moved laterally as a unit to the packaging machine. In other embodiments the unit of containers is moved vertically and the guides need not be removed.

4 Claims, 10 Drawing Figures

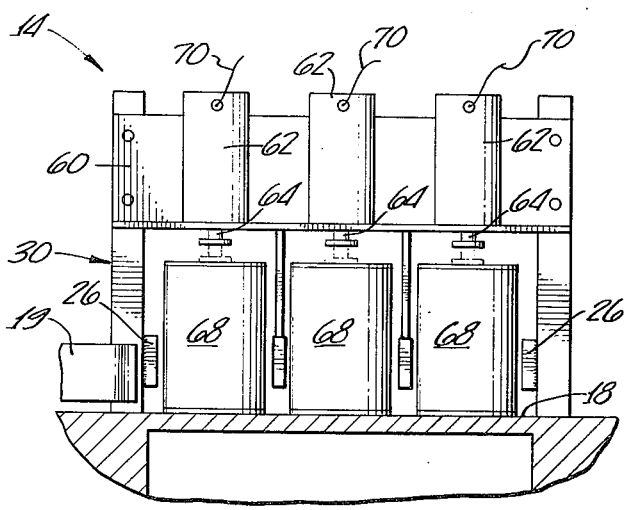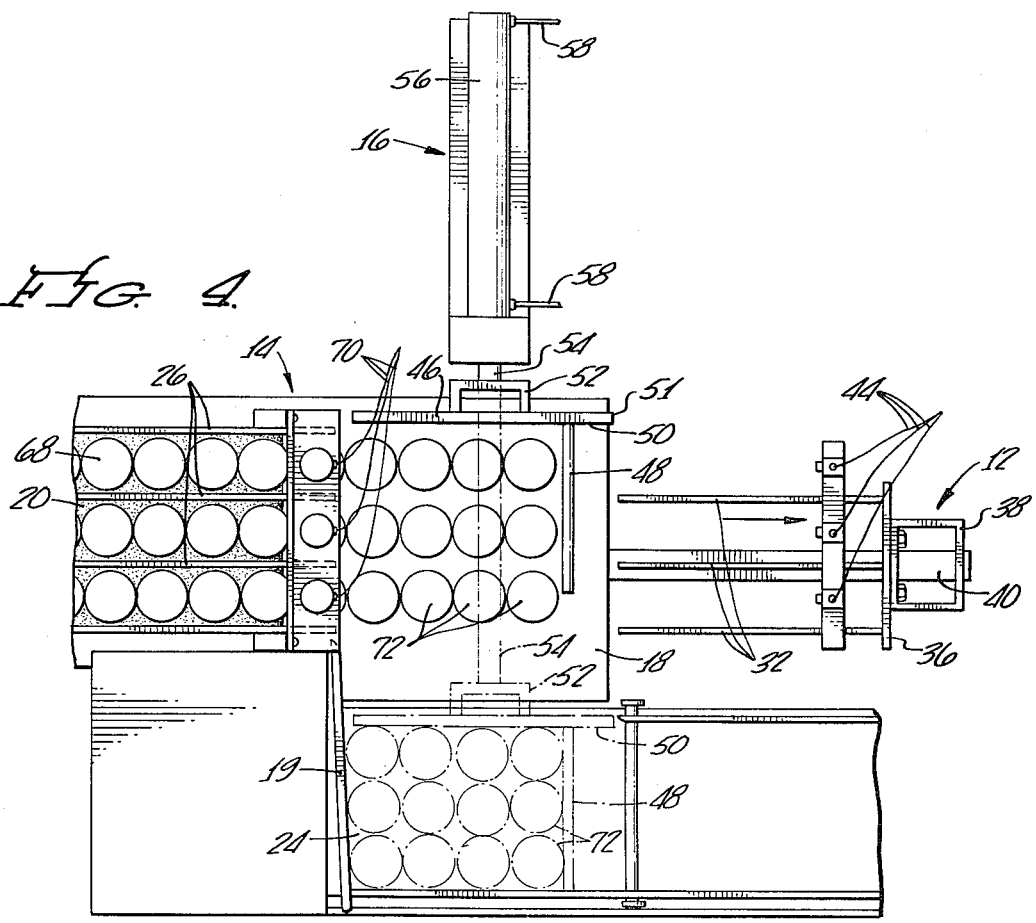

CONTAINER ACCUMULATING APPARATUS

BACKGROUND OF THE INVENTION

This invention relates to processes in conjunction with the packaging of containers, and more specifically relates to the interface between an operational line such as a container manufacturing or filling line and the casing machine where the containers are cased for shipment. It is well known in the art that the advances in manufacturing processes have reached the point of sophistication to have the capability to move large quantities of containers along the process line. Regardless of whether the process is actually producing the container itself or filling the container with a certain product, large quantities of containers reach the end of the assembly line.

Reference is made to my U.S. Pat. No. 3,808,770 for a Casing Machine and Method, designed to receive containers and efficiently package them in cases for shipment. It has been noted, however, that the interface between the output of the containers from the line and the casing mechanism has been unsatisfactory. At this interface the containers must be accumulated into an array of the size desired for packaging, e.g. three rows of four containers each. Prior art mechanisms have been limited as to the types and shapes of containers they could handle, and the efficiency with which they could handle them.

Particular difficulty has been encountered in handling containers which tend to be unstable and tip when handled. Moreover, the handling of cylindrical containers presents problems in accumulation because their round sides present no stabilizing abutting surfaces.

Summary of the Invention

The present invention is comprised of a deck plate or feeder platform which receives a plurality of aligned rows of containers from the line. Operated in conjunction with this feeder platform is a stop mechanism which limits the flow of the containers onto the feeder platform to the specified amount desired in each row to accumulate the desired package array. The plurality of aligned rows of containers are maintained in their uniform orientation by a retractable set of guide rails mounted over the platform. When the desired number of containers are placed on the feeder platform, the guide rails are retracted and a cross pusher moves the plurality of rows of containers across the feeder platform onto the casing mechanism.

The guide rails permit accumulation of substantially any type of container irrespective of its tendency to tip or move laterally out of line when pushed. This also provides great flexibility for line using different types of containers from day to day.

Alternate embodiments are envisioned wherein the guide rails mounted over the feeder platform are retracted vertically instead of horizontally. In addition, embodiments are envisioned wherein the feeder platform would be raised vertically to place the containers into a carton which would be located above the feeder platform. Also, the invention could be utilized by laterally moving the feeder platform, allowing the containers to drop down into a carton situated below the platform.

Brief Description of the Drawings

FIG. 3 is a sectional view taken along the lines 3—3 of FIG. 2;

FIG. 4 is a plan view of the apparatus with the guide rails retracted and the cross pusher in the advanced position shown in phantom;

Detailed Description of the Invention

Figure 1:
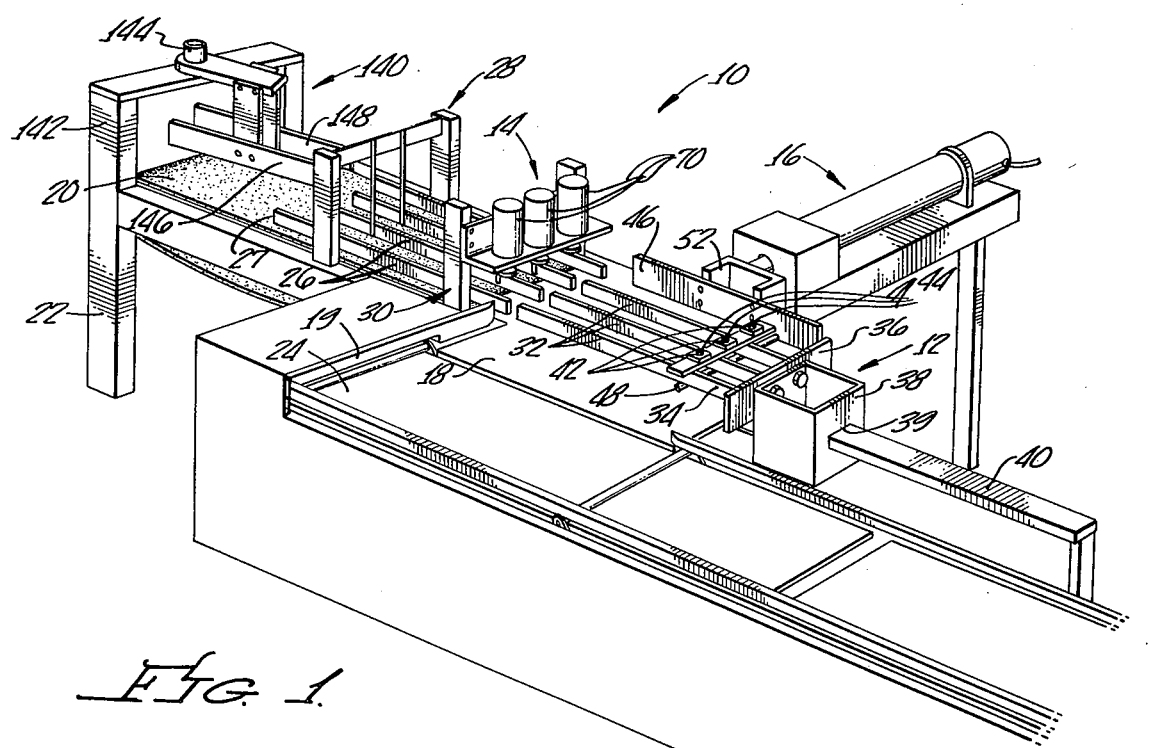
FIG. 1 is an overall perspective view of the accumulator apparatus.

Referring to FIG. 1, the invention is shown generally at 10 and is comprised of four primary elements which include a retractable guide rail mechanism 12, a container feed stop mechanism 14, a cross mechanism 16, and a feeder platform deck plate 18. Positioned adjacent the feeder platform 18 is a conveyor belt 20 which is the terminating portion of the assembly line and is supported by a frame 22. Also positioned adjacent the feeder platform 18 is a platform 24 of my "Kwik-Caser" machine which is described in detail in the U.S. Pat. No. 3,808,770.

To properly orient the items coming along the conveyor belt 20 a series of separator rails 26 are mounted slightly above the conveyor belt 20. The separator rails 26 are supported by two groups of vertical supports 28 and 30. Longitudinally aligned with the separator rails 26 are a series of guide rails 32 which are retractably mounted over the stationary feeder platform 18. The forward longitudinal ends 34 of the guide rails 32 are attached to a mounting plate 36 which in turn is bolted to a mounting bracket 38. By a drive mechanism not shown, a retracting rail 40 which slidably engages the mounting bracket 38 through the aperture 39 guides the retraction of the mounting bracket 38 and the guide rails 32 in a direction away from the separator rails 26 to a position clear of the feeder platform 18. Mounted toward the forward ends 34 of the guide rails 32 are a series of sensors 42 which are designed to sense contact with containers or items that will be fed onto the base plate 18 from the conveyor belt 20. The sensors 42 are electrically connected by the wires 44 to an overall system control circuit (not shown) which controls the operation of the various components.

As shown more clearly in FIG. 4, the cross pusher mechanism 16 includes pusher plate 46 and an orienting bar 48 which is attached to the front face 50 and adjacent the outside edge 51 of the pusher plate 46 in a perpendicular orientation. The pusher plate 46 is connected to a mounting bracket 52 which is affixed to a pusher rod or shaft 54 that propels the pusher plate 46 across the feeder platform 18. The hydraulic plate pneumatic cylinder 56 controls the movement of the pusher rod 54 across the platform 18 and the activation of the mechanism 56 is controlled through the hydraulic or pneumatic lines 58 connected to an overall system control (not shown).

Referring to FIG. 3, the stop mechanism 14 is mounted on a support beam 60 which is attached to the group of vertical supports 30 which also provide support for the separator rails 26. The stop mechanism 14 includes a series of electrically hydraulically or pneumatically activated stop guards 62 with each having a stop bar 64 that are designed to engage selectively with the containers 68 which are proceeding along the conveyor belt 20. The stop guards 62 are activated through the connections 70 connected to an overall control system (not shown).

Turning now to the operation of the invention as described above, reference is made to FIGS. 2 through 4. The containers 60 move along the assembly line or conveyor belt 20 between the separator rails 26 and onto the adjacent stationary feeder platform 18 between the guide rails 32. Each container is pushed across the feeder platform 18 by the containers behind it on the conveyor 20. The guide rails 32 keep the containers in rows as they are pushed forward across the platform even if they are round in cross-section. Moreover, the guide rails 32 permit handling of relatively unstable containers such as tall empty plastic bottles.

when the first containers 72 the sensors 42 a signal is sent through the wires 44 to a central control (not shown). As the containers move forward across the platform 18 only under pressure from the containers behind, contact with the sensor 42 means that row is full on the platform. When a sensor 42 has been contacted indicating that row is full, the central control will cause the stop mechanism 14 to activate the stop guard for that row. The stop guard rods 64 move down into the phantom position as shown in FIG. 3 to contact and hold the containers 68 which are at the end of the conveyor belt 20. Since the assembly line or conveyor belt 20 is normally in constant motion, the stop mechanism 14 will prevent any further forward movement of the containers 68 in its row onto the feeder platform.

Once all of the stop mechanisms 14 have engaged the containers 68 on the end of the conveyor belt 20, meaning that all of the rows on the platform 18 are full, the control circuit activates the retraction of the guide rails 32 from above the feeder platform 18 and between the containers 68. Once the guide rails 32 have been completely retracted from engagement with the containers 68, the controls activate the cross pusher mechanism which will initiate the movement of the cross pusher plate 46 over the surface of the feeder platform 18 in the direction of the caser platform 24 as shown in phantom in FIG. 4. It will be noted that the alignment bar 48 in conjunction with the cross pusher plate 46 and a stationary guide 19 extending over the platform 24 confine three sides of the container array and maintain the plurality of rows of containers aligned and in uniform relation with each other as a complete unit during the movement transversely across the feeder platform 18 and onto the caser platform 24.

The number of containers 68 within the unit or group of containers that is pushed across the feeder platform is designed to be the proper number and in the proper orientation to fill one packaging carton in the caser mechanism. Consequently, the caser mechanism will always receive as a unit in the proper orientation and the exact number of containers for each packaging carton that is being utilized by the caser.

Figure 2:
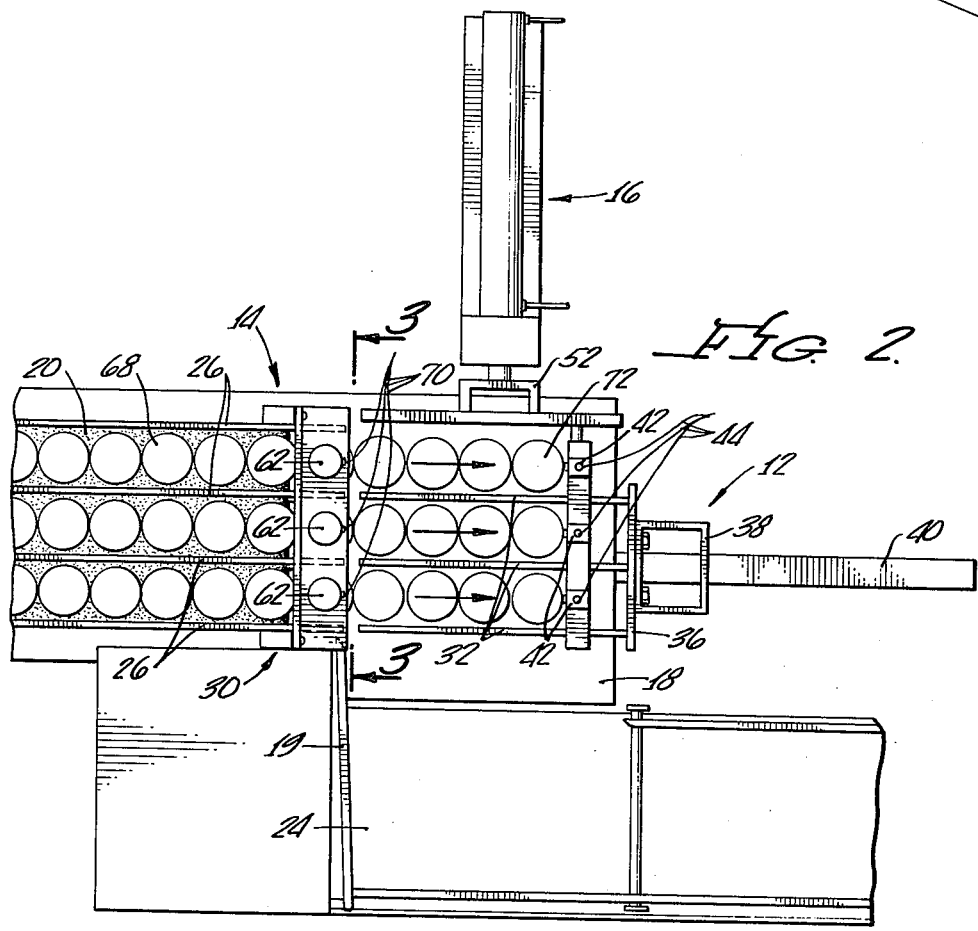
FIG. 2 is a plan view of the accumulator showing containers being moved onto the feeder platform.

Once the unit of containers 68 are placed on the caser platform, the cross pusher plate is retracted by the shaft 54 to its original position as shown in FIG. 4, which will then signal the return advancement of the guide rail 32 to their original position in alignment with the separator rails 26 in a position over the feeder platform 18 as shown in FIG. 2. Furthermore, once the guide rail mechanism 12 is in its position as shown in FIG. 2, the stop guard mechanism 14 will be activated to retract the stop guards 64 from their phantom position in FIG. 3 to their original position in order to allow the advancement of the containers 68 onto the feeder phantom 18. Once the forward containers 72 again reach the sensors 42 in the guide rail mechanism 14, the sequence of steps as described above are again repeated to place another properly aligned and number of containers onto the caser platform 24. This process is continually repeated and provides the line 20 and the caser with the necessary interface in order to mechanically accumulate the desired array of containers and transfer them to the caser mechanism efficiently.

Figure 5:
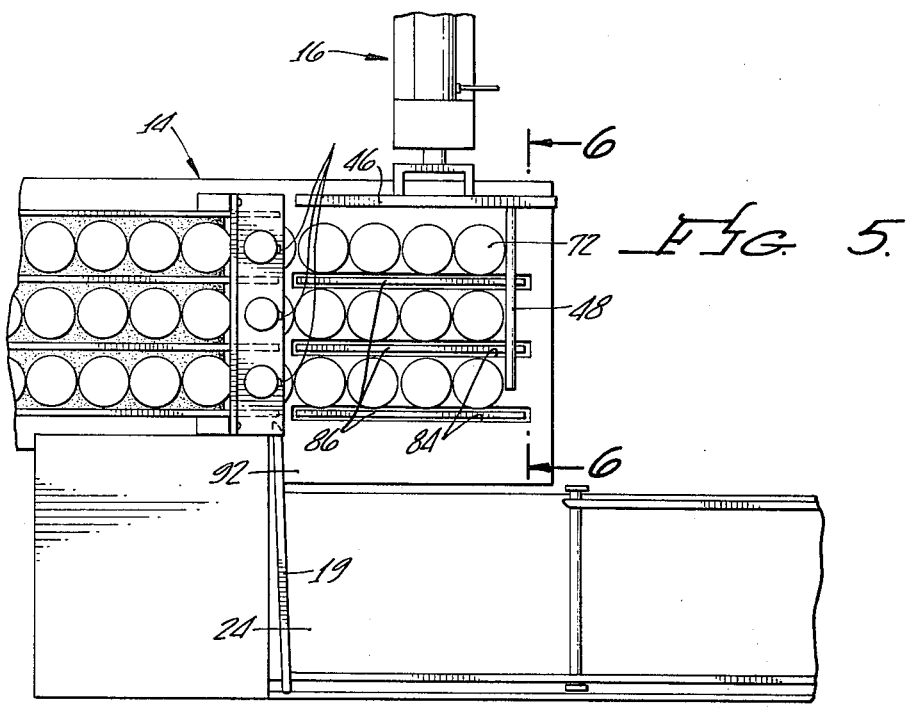
FIG. 5 is a plan view of an alternate embodiment of the apparatus.
Figure 6:
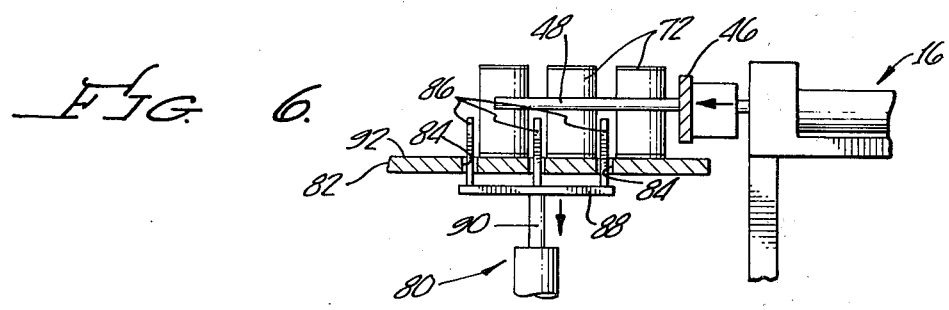
FIG. 6 is a sectional view taken along the lines 6—6 of FIG. 5.

Referring to FIGS. 5 and 6 an alternate embodiment of the invention is shown wherein the guide rail mechanism 80, shown more clearly in FIG. 6, is designed to retract below the feeder platform or deck plate 82 which has slotted apertures 84 to accommodate the vertically oriented guide rails 86. A cross support beam 88 supports the guide rails 86 and is connected to the movable shaft 90 which moves the guide rails 86 to a position above or below the top surface 92 of the feeder platform 82. The remainder of the invention is the same as disclosed in the previously described embodiment with the same cross pusher mechanism 16 and stop guard mechanism 14. However, the sensors 43 of the embodiment previously discussed would be replaced by an alternative sensing mechanism (not shown) for sensing the advanced movement of the first containers 72 when they are adjacent the alignment bar 48.

With respect to the operation of this alternate embodiment of the invention, once the forward containers 72 reaches a position adjacent the alignment bar 48, the sensing mechanism (not shown) will initiate a signal to the stop guard mechanism 14 to stop the flow of the containers from the assembly line onto the feeder platform 82. The guide rails 86 are then retracted through the apertures 84 to a position below the feeder platform 82, allowing the movement of the cross plate 46 and alignment bar 48 across the feeder platform 82. The group of containers are moved transversely as a unit from the base plate to the caser platform 24.

Figure 7:
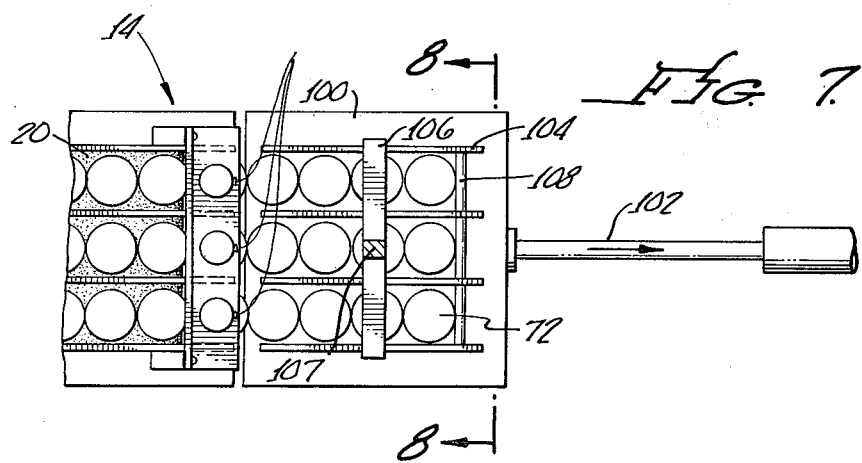
FIG. 7 is a plan view of a second alternate embodiment of the invention.
Figure 8:
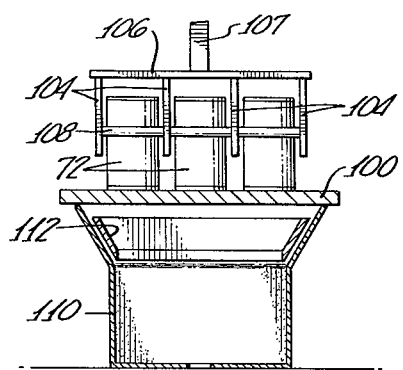
FIG. 8 is a sectional view taken along the lines 8—8 of FIG. 7.

A second alternate embodiment is shown in FIGS. 7 and 8 wherein the feeder platform or deck plate 100 is attached to a retractable shaft 102. The guide rails 104 are attached to a cross support beam 106 which is mounted in a fixed position on a support beam 107 above the feeder platform 100. This alternate embodiment of the invention does not utilize a cross plate or cross pusher mechanism. Turning to the operation of this second alternate embodiment of the invention, the containers 68 proceed from the assembly line 20 onto the feeder platform 100 with the forward containers 72 reaching a position next to a stop rail 108 which is mounted to the guide rails 104. Through a sensing mechanism (not shown) the contact of these forward containers 72 with the stop rail 108 initiates the operation of the stop guard mechanism 14 as previously discussed. Once the stop guard mechanism has been activated to restrict the contained movement of the containers 68 onto the feeder platform 100, the retractable rod 102 moves in the direction of the arrow shown in FIG. 7 resulting in the movement of the feeder platform 10 from underneath the containers 68. As a result, the containers 68 as shown in FIG. 8 move transversely by dropping down into a packaging carton 110 which is positioned beneath the original position of the base plate 100. The movement or retraction of the feeder platform 100 is quite rapid in order to provide the dropping of the containers as a unit substantially uniformly into the packaging container 110. It will be noted that a guide mechanism 112 is positioned just below the feeder platform 100 in order to guide the containers into the carton 110. In the embodiment shown, the guide 112 also brings the containers closer together to take up the gap which is formed between the rows of container by the guide rails 104 being interspaced between the rows of containers. In other instances where partitions are to be used in the container, it may be desirable to leave the gap.

Figure 9:
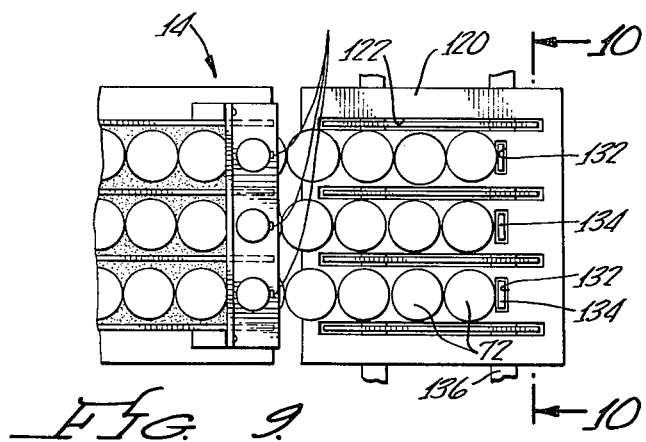
FIG. 9 is a plan view of a third alternate embodiment of the invention.
Figure 10:
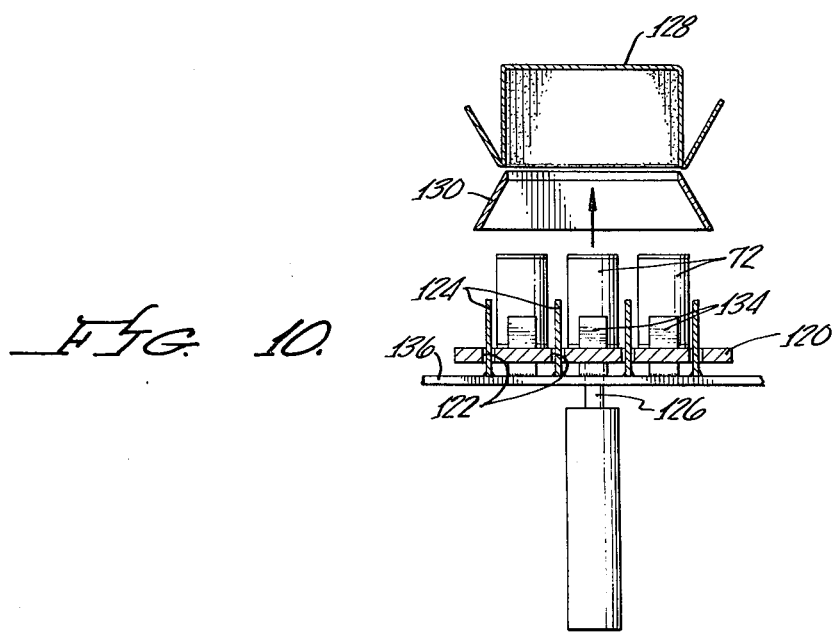
FIG. 10 is a sectional view taken along the lines 10—10 in FIG. 9.

Once the containers are within the packaging carton 110, the feeder platform 100 is moved back into position adjacent the assembly line 20 and the stop guard mechanism 14 is released to allow the containers to again proceed onto the feeder platform 100, so that the sequence may be repeated to place another uniform group of containers as a unit into a packaging carton 110. A third alternate embodiment is depicted in FIGS. 9 and 10 wherein the feeder platform or deck plate 120 has a series of apertured slots 122 to allow relative movement of the feeder platform 120 with respect to the guide rails 124. The feeder platform 120 is connected to a lifting rod 126 which moves the feeder platform 120 vertically. Mounted above feeder platform 120 is a mechanism (not shown) for holding a packaging carton 128 for receipt of the containers 68. Positioned between the packaging carton 128 and the feeder platform 120 is a guide structure 130 to aid in the proper placement of the containers 68 within the packaging carton 128. Also located within the feeder platform 120 are a series of apertures 132 to receive the stop rails 134 which limit the movement of the containers once they are on the feeder platform 120.

Turning to the operation of this third embodiment of the invention, the containers 68 proceed from the assembly line 20 onto the feeder platform 120 until the forward containers 72 come into engagement with the stop rails 134 which have sensor mechanisms (not shown). The stop guard mechanism 14 receives the signal from the sensors in the manner previously discussed to limit the flow of the containers 68 onto the feeder platform 120. Once the stop mechanisms 14 has been activated, the lifting rod 126 lifts the feeder platform 120 vertically up in a direction of the arrow in FIG. 10 moving the containers 68 transversely, placing them in the packaging carton 128.

With respect to FIG. 1, it should be noted that a swing gate 140 is mounted on a support 142 above the conveyor belt 20 adjacent the rear edges 27 of the separator rails 26 on all embodiments of the invention. The swing gate oscillates about a junction 144. The swing gate 140 has a pair of directing rails 146 and 148 which are spaced approximately the same distance as the space between the guide rails 26. The containers 68 normally come down the conveyor belt in a single line, and the swing gate 140 receives the single line and directs the containers into the spaces between the separator rails 26. The swing gate 140 periodically oscillates about the junction 144 to have the directing rails 146 and 148 repetitively aligned successively with each space between the separator rails to insure the formation of the plurality of rows of containers.

It should be understood that while this invention finds particular advantage in combination with my previously described Kwik-Caser it is not limited to that use.

I claim:

1. Apparatus for transferring containers from a process line to a packaging area, said apparatus comprising:

an accumulation station located at the end of said process line for receiving containers moving in a downstream direction from said process line;

a plurality of guide rails disposed over said accumulation station extending longitudinally in said downstream direction and spaced transversely to said downstream direction for establishing a plurality of longitudinal rows of containers side by side on said accumulation station by guiding both sides of each row;

means for retracting said guide rails horizontally, longitudinally in said downstream direction from said first position over said accumulation station in a second position longitudinally spaced in said downstream direction from said containers on said station; and means for moving said rows of containers laternally transversely to said downstream direction as a unit to a location separate from said accumulation station.

2. Apparatus as defined in claim 1 wherein:

said moving means comprises a cross pusher means mounted adjacent one edge of said station for movement transversely across said station, and an alignment bar attached to the downstream end of said pusher plate to maintain said plurality of rows of containers as said unit for said movement to said location separate from said accumulation station; and further comprising sensor means mounted for retraction downstream with said guide rails, said sensor means being arranged when said guide rails are in said first position to stop movement of said containers downstream onto said accumulation station at a location slightly upstream from said alignment bar.

3. Apparatus as defined in claim 2, wherein said sensor means comprises:

means on said guide rails for sensing the presence of the first container in each row at a position longitudinally spaced upstream from the alignment bar; and means responsive to said sensing means for interrupting flow of containers onto that row on the station.

4. Apparatus for transferring containers from a process line to a packaging area, said apparatus comprising:

an accumulation station located at the end of said process line for receiving containers from said process line;

a plurality of transversely spaced longitudinal guide rails at least a portion of which is positioned above said station for establishing a plurality of longitudinal rows of containers side by side on said station by guiding both sides of each row;

means for retracting said guide rails from between the rows of container;

a cross pusher means mounted adjacent one edge of said station for movement transversely across said station to transfer said rows of containers laterally transversely as a unit to a location separate from said accumulation station; a transverse alignment bar attached to said pusher means and disposed at the forward end of said rows of containers to maintain said rows as a unit when moved to said separate location; and means responsive to the position of said containers for stopping longitudinal advancement of said rows of containers at said station is spaced relation from said alignment bar to avoid jamming.

* * * * *

UNITED STATES PATENT OFFICE
CERTIFICATE OF CORRECTION

PATENT NO. : 3,979,878
DATED : September 14, 1976
INVENTOR(S) : Joseph C. Berney It is certified that error appears in the above-identified patent and that said Letters Patent are hereby corrected as shown below:

Col. 3, line 28, "when" should be --When--

Col. 3, line 28, after "72" insert --contact--

Col. 3, line 33, after "platform" insert --18--

Signed and Sealed this

First Day of March 1977

[SEAL]

Attest:

RUTH C. MASON
Attesting Officer

C. MARSHALL DANN
Commissioner of Patents and Trademarks